United States Patent

Hawkes et al.

[15] 3,650,865

[45] Mar. 21, 1972

[54] METHOD OF INFLATING TIRES WITH FOAMABLE MATERIAL

[72] Inventors: Joseph S. Hawkes, Silver Lake; David L. Turk, Cuyahoga Falls, both of Ohio

[73] Assignee: The Goodyear Tire & Rubber Company, Akron, Ohio

[22] Filed: Dec. 15, 1969

[21] Appl. No.: 884,849

[52] U.S. Cl. .....156/119, 156/79, 264/54

[51] Int. Cl. .....B29h 13/00

[58] Field of Search .....156/79, 81, 112, 113, 118, 156/119; 264/45, 54, 55

[56] References Cited

UNITED STATES PATENTS

| | | | |
|---|---|---|---|
| 1,041,377 | 10/1912 | Trautman | 156/79 |
| 2,213,028 | 8/1940 | Kraft | 156/119 |
| 2,297,022 | 9/1942 | Pfleumer | 264/55 X |
| 3,256,123 | 6/1966 | Hart | 156/119 X |

FOREIGN PATENTS OR APPLICATIONS

| | | | |
|---|---|---|---|
| 714,026 | 7/1965 | Canada | 156/112 |
| 672,372 | 2/1950 | Great Britain | 156/113 |

*Primary Examiner*—Benjamin A. Borchelt
*Assistant Examiner*—Stephen C. Bentley
*Attorney*—F. W. Brunner and Harlan E. Hummer

[57] ABSTRACT

A method for producing a tire inflated with foamable material such as synthetic rubber. A number of preformed strips of unfoamed material are annularly layered within a tire, the first layer being against the inside crown of the tire. Any joints between successive layers are arcuately staggered. The layers of unfoamed material are compacted or compressed against each other and the tire, forming a laminated, foamable, annular insert within the tire cavity. A predetermined amount of unfoamed material is uniformly placed within the tire to give a desired tire pressure, when the material is foamed.

28 Claims, 3 Drawing Figures

PATENTED MAR 21 1972

3,650,865

INVENTORS
JOSEPH S. HAWKES
DAVID L. TURK

BY Harlan E. Hummer

ATTORNEY

METHOD OF INFLATING TIRES WITH FOAMABLE MATERIAL

BACKGROUND OF INVENTION

The invention relates to tires which are inflated with foamable material such as synthetic rubber, as distinguished from tires which are merely filled with foamed material, that is, the foamed material fills the tire cavity but does not exert any appreciable pressure against the tire body or casing. In a finished foam inflated tire, the foamed material is designed to produce a desired pressure, which gives the tire the most favorable ride, performance, and durability.

Foam inflated tires are especially useful in applications involving industrial and off-the-road vehicles, where it is essential to keep the vehicles in operation, since the downtime, or time lost for repairs is very costly. Foam inflated tires are literally non-deflatable, and substantially reduce or eliminate time lost in repairing tires.

Tires inflated with foamed material to predetermined pressures must be made precisely, and a problem arises in placing the proper amount of unfoamed material uniformly or evenly within the tire cavity to produce a tire having the desired pressure and most favorable performance characteristics. In some methods, an extruded rod or log of unfoamed synthetic rubber is cut to a desired length, formed into an annulus, and stuffed within the cavity of a cured tire. However, the annular log does not generally conform to the configuration of the tire cavity and the available space within the tire cavity is not efficiently used. More important, it is exceedingly difficult to extrude a log for a particular tire where the exact length required to fill the tire cavity will correspondingly give the exact amount of material for a desired pressure. As a result, the tire pressures have been erratic and limited to about 60–70 p.s.i. as a maximum. Moreover, it has been found that, using this particular method, the finished foamed insert is not uniformly distributed within the tire cavity, and the joint between the abutting ends of the log extends transversely through the log and adversely affects the finished foamed insert in this area.

The invention is directed to a method for more uniformly distributing unfoamed material within the tire cavity, thereby producing a more homogeneous foamed insert within the tire. Moreover, the amount of unfoamed matter placed within the tire cavity is more accurately controlled giving more exact tire pressures which, to date, have been as high as about 140–150 p.s.i.

Briefly stated, the invention is in a method for producing a tire which is inflated with foamed rubber or like material. Depending on the pressure desired, the tire can be partially or completely filled with such material. Extruded strips of unfoamed rubber are uniformly, concentrically placed within a tire cavity forming a number of layers of unfoamed material, the first layer being against the inside crown of the tire. Any joints between successive layers are arcuately staggered. Enough material is compacted within the tire cavity to give a predetermined desired tire pressure after the material is cured. The tire is then mounted on a rim and heated to foam and vulcanize or cure the rubber within the tire cavity.

DESCRIPTION OF THE DRAWING

The following description will be better understood by referring to the annexed drawing wherein.

DESCRIPTION OF THE INVENTION

Figure 1:
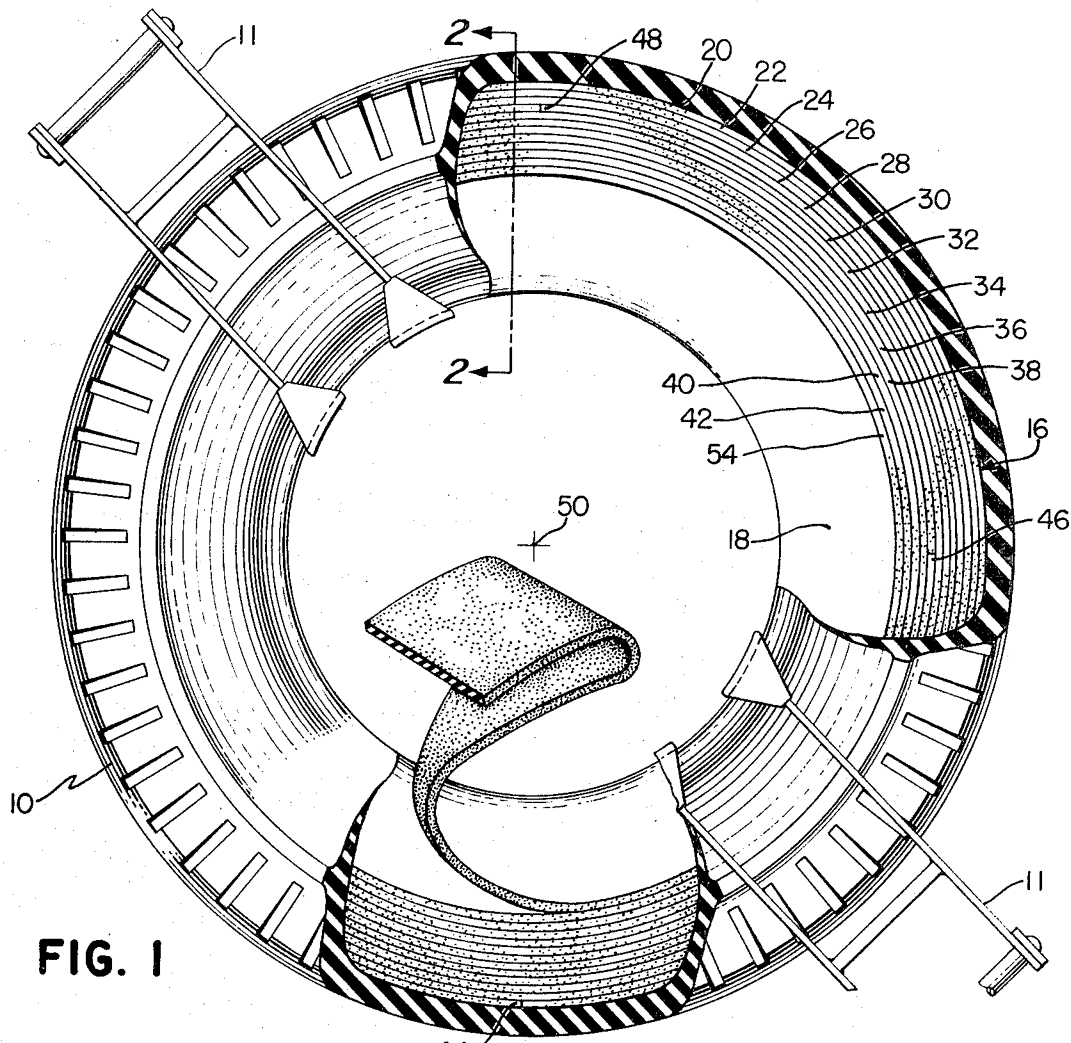
FIG. 1 is a side view of a tire with portions thereof cut away to illustrate the layering of the strips of unfoamed material within the tire cavity.

Referring more particularly to the drawing, there is shown a conventionally designed tire 10, which is preferably cured. The tire 10 is vertically mounted for rotation on any suitable machine, e.g., a tire spreader 11 manufactured by the Branick Corporation of North Dakota. The machine 11 engages and spreads the beads 12 and 14 to facilitate forming an expandable insert 16 within the annular cavity 18 of the tire 10.

The insert 16 is preferably formed from foamable synthetic rubber, including styrene-butadiene, ethylene-propylene terpolymer, silicone polymer, polyisoprene, or polybutadiene, but can be formed from natural rubber or any elastomeric material which is expandable. The foamable synthetic rubber is extruded in sheets or strips for layering within the tire cavity 18. The strips vary in thickness and width depending on the size of the tire. For example, strips of from about one-quarter to about 1 inch thick and varying in width from about 1 to about 12 inches are used to form a foamable insert 16 within the cavity 18 of an 855–14 passenger tire, or a 10.00–20 truck tire with a 20-inch bead diameter. However, strips of greater thickness, e.g., 2 inches to 2 feet are more practical for large earthmover tires, since the process would become too lengthy if smaller strips were used. In any case, the thickness of the strips are relatively thin compared to the depth (D) of the annular cavity 18, such that a number of layers are required to build up the insert 16.

The tire 10, as previously indicated, is held and rotated in a vertical plane for easier handling and placing the strips of unfoamed synthetic rubber within the tire cavity 18. The inner crown 20 of the tire 10 is first swabbed with any suitable adhesive for increasing the adhesion between the first layer 22 of unfoamed synthetic rubber and the tire 10. The first layer 22 of unfoamed rubber is positioned against the inner crown 20 of the tire 10. Successive layers 24–42 of unfoamed rubber are then similarly placed within the tire cavity 18 forming a laminated or built-up unfoamed rubber insert 16 having a number of laminates or layers in annular planes which are concentric and generally parallel to the annular planes of the tread and inside crown 20 of the tire 10. The width of each strip preferably closely approximates the width (W) of the tire cavity 18. Any joints, e.g., joints 44–48, between successive layers of the elastomeric insert 16 are in arcuate spaced relation thereby eliminating a continuous radial joint and substantially reducing serious defects in these areas of the finished foamed rubber insert 16.

The layers 22–42 of unfoamed rubber are disposed within the tire cavity 18 in successively smaller coiled relation. In order to reduce the number of joints between the successive layers 22–42, a continuous strip of unfoamed rubber can be spirally disposed within the tire cavity 18. The quantity of foamable material which must be inserted in the tire cavity 18, is related to the density of the material and the blowing agent used, and can be closely determined by conventional calculations and empirical data. The successive layers 22–42 are generally equal in thickness and width, and if any more material is needed, a separate compensator strip 54 is uniformly placed around the inner periphery 56 of the innermost layer 42. Thus, the laminated, foamable insert 16 is more nearly uniform throughout its annular length, which is important to eliminate problems, such as ride disturbance, resulting from circumferential or annular nonuniformity.

Figure 2:
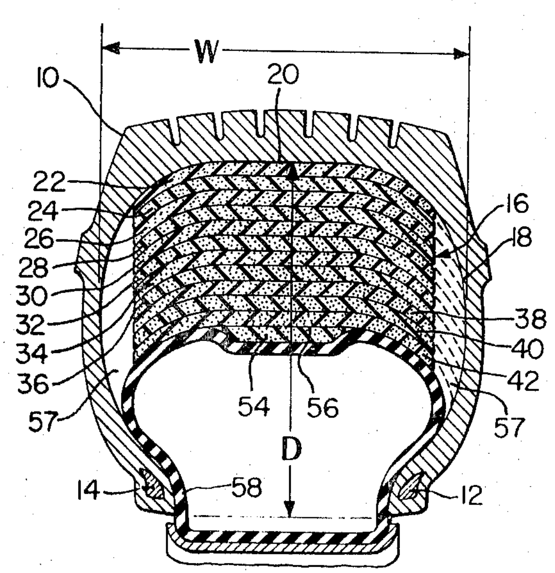
FIG. 2 is a section of the tire viewed from the line 2—2 of FIG. 1.
Figure 3:
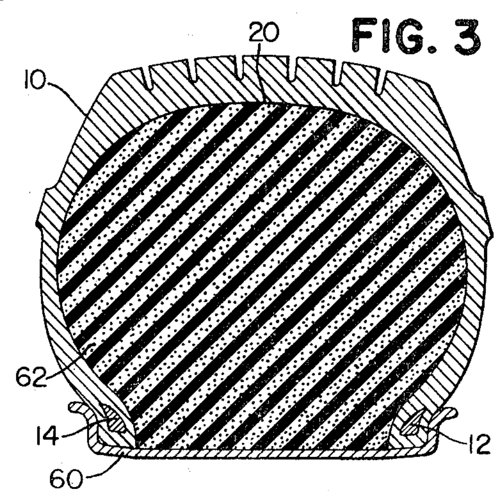
FIG. 3 is a cross section of the finished tire on a rim showing the foamed insert disposed in the cavity formed by the tire and the rim.

An inner tube 58 is mounted within the cavity 18 and inflated to compact or compress the layers 22–42 of unfoamed rubber together against each other and the tire 10. In cases where it is desirable to completely fill the tire cavity 18, the compacted layers 20–42 of material are squeezed such that the material spreads laterally against the sidewalls of the tire to fill any crevices or voids 57 between the strips and sidewalls (see dotted layers against sidewall in FIG. 2). The inner tube 58 can be inserted and inflated after each successive layer is placed within the tire cavity 18, or after a number of layers have been inserted, or after all of the layers have been inserted depending on the number of layers or amount of foamable material required to obtain the desired tire pressure. The tire 10 with the unfoamed laminated insert 16 coiled within the tire cavity 18, is mounted on a rim 60 and exposed to heat to foam and cure the rubber insert 16. The completely cured insert 62 (FIG. 3) is designed to exert a desired pressure against the tire 10 and not merely fill the tire cavity 18.

Another method of forming the insert 16 within the tire cavity 18 is to place a number of strips in lateral side-by-side relation forming a composite layer of adjacently disposed strips. In the case of rectangular strips, the plane of the individual strips can be parallel, or angularly disposed to the annular planes of the tread and inside crown 20 of the tire 10. For example, the first layer 22 could be compositely formed from 8 strips, each measuring 1 inch wide and one half inch thick, if the width (W) were 8 inches and the strips were laid flat in side-by-side relation. The composite layer 22, thus formed, would be one half inch thick. If the same strips were placed on edge, the composite layer 22 would be one inch thick and formed from 16 strips. Similar to the other method, however, a number of composite layers are required to build the insert 16, since the uniformity is more accurately controlled using a number of layers, rather than only one or even two layers.

The tire assembly, i.e., the cured tire 10, laminated rubber insert 16, and rim 60, is freely disposed within a curing oven. The tire assembly is exposed to hot air heated to temperatures in the range of from about 200° F. to about 350° F. for a variable period of time depending on the particular size of the tire and rubber insert 16. For example, the unfoamed insert 16 in a typical passenger tire with a desired finish tire pressure of about 28–30 p.s.i., is cured in about 8 hours when exposed to hot air at a temperature of about 280° F.

The pressure of the completed foam inflated tire 10 is checked by subjecting the tire 10 to varying loads and testing for deflection. The results are graphed and compared with graphs plotted for similarly tested pneumatic tires under varying air pressures. The results provide a basis for determining the amount of foamable material which must be placed in any given tire to obtain a desired pressure within the tire. The amount of foamable material placed within the tire cavity 18 is more readily controlled using the aforementioned method of layering strips of material within the tire cavity 18. Moreover, the completed foamed annular insert 62 is more homogeneous and concentrically formed and disposed within the tire cavity 18.

In some cases where it is desirable to fill only a portion of the tire cavity 18 with foamed rubber, an annular space filler, e.g., at least a partially inflated inner tube similar to the inner tube 58, can be positioned adjacent the wheel rim 60 to fill the remaining portion of the tire cavity 18 and compressively engage the rubber insert 16 when it is cured or foamed. A rigid metal torus or annulus extending from the rim 60 into the tire cavity 18 may be used in place of the inner tube type filler to partially fill the tire cavity 18 and maintain the foamed rubber in its compressed configuration within the tire cavity 18. Such a structure will keep the tire from deflating out of shape which is important when the vehicle is operating in a combat zone. The cure time, weight and cost, in certain cases, is drastically reduced by using such space fillers which also provides an alternate method for inflating tires with foamable material by layering thin strips of unfoamed material within the tire cavity 18.

Thus, there has been described a unique and novel method for producing a tire inflated with foamed synthetic rubber or like material. Such a tire is non-deflatable. Using this method, the amount of material placed within the tire cavity is more readily controlled and the completed foamed annulus is more uniform than with other methods, because the unfoamed insert has a cross-sectional area which is more uniform throughout its arcuate length.

While certain representative embodiments and details have been shown for the purpose of illustrating the invention, it will be apparent to those skilled in the art that various changes and modifications may be made therein without departing from the spirit or scope of the invention.

What is claimed is:

1. A method for producing a non-deflatable tire, comprising the steps of placing uncured material, expansible upon curing in abutting annular layers within the cavity of a previously molded and vulcanized tire forming therein an uncured laminated insert which is expansible upon curing, and heating the tire with the laminated insert to a temperature in the range of from 200° to 350° F. to expand and cure the material.

2. The method of claim 1, wherein the annular layers are relatively thin compared to the depth (D) of the tire cavity such that a number of layers are required.

3. The method of claim 2, wherein the material is foamable synthetic rubber.

4. A method of inflating a tire with foamable elastomeric material, comprising the steps of:

a. layering at least one preformed strip of unfoamed, foamable elastomeric material in abutting annular relation within the cavity of a previously cured tire, forming therein a laminated, annular insert which, when foamed, expands within the tire and produces a predetermined desired tire pressure;

b. mounting the tire with the unfoamed material therein on a rim; and c. heating the tire, mounted on the rim, to a temperature in the range of from 200° to 350° F. to foam and cure the material layered therein.

5. The method of claim 4, wherein the layers of unfoamed material are in spiralling relation about the axis of the cured tire.

6. The method of claim 4, wherein any joints between successive layers of unfoamed material are in arcuate spaced relation.

7. The method of claim 4, wherein the cross-sectional area of the insert is substantially uniform throughout its arcuate length.

8. The method of claim 4, wherein the thickness of each strip is relatively thin in comparison to the depth (D) of the tire cavity, such that a number of layers are required to form the insert.

9. The method of claim 8, wherein each strip is from about one-fourth to about 1 inch thick.

10. The method of claim 4, which includes the step of compacting the layers of unfoamed material radially against each other and the inner crown of the tire prior to mounting the tire on the rim.

11. The method of claim 10, wherein the step of compacting includes mounting an inner tube adjacent one of the layered strips of unfoamed material, and inflating the inner tube to compressively engage said layer and exert an outwardly directed radial force thereagainst.

12. The method of claim 4, wherein the step of layering includes placing the first strip of unfoamed material against the inner crown of the tire.

13 The method of claim 12, which includes swabbing the inner crown of the tire with an adhesive prior to placing the first strip of unfoamed material thereagainst.

14. The method of claim 4, wherein the elastomeric material is natural rubber.

15. The method of claim 4, wherein the unfoamed material is synthetic rubber.

16. The method of claim 15, wherein the synthetic rubber is ethylene-propylene terpolymer.

17. The method of claim 15, wherein the synthetic rubber is polyisoprene.

18. The method of claim 15, wherein the synthetic rubber is silicone polymer.

19. The method of claim 15, wherein the synthetic rubber is polybutadiene.

20. The method of claim 4, wherein the step of heating includes contacting the tire with air heated to a temperature of about 280° F.

21. The method of claim 4, which includes placing an annular space filler adjacent the rim to partially fill the tire cavity and compressively engage the material when it is cured.

22. The method of claim 21, wherein the space filler is an inner tube at least partially filled with fluid.

23. The method of claim 21, wherein the space filler is a rigid annulus for maintaining the cured insert in its compressed configuration.

24. A method of inflating a tire to a predetermined pressure with foamable elastomeric material, comprising the steps of:

a. taking a previously molded and cured tire and applying an adhesive on the inner crown of the tire;

b. layering a preformed strip of unfoamed synthetic rubber in annular relation against the inner crown of the tire;

c. successively layering similar strips of unfoamed synthetic rubber in annular relation concentric with the layer adjacent the inner crown of the tire, to build up a laminated, annular insert within the cavity of the tire;

d. compacting the layered strips of unfoamed synthetic rubber against each other and the inner crown of the tire, after a predetermined amount of said rubber has been placed within the tire;

e. mounting the tire and compacted unfoamed synthetic rubber on a wheel rim; and f. heating the tire, mounted on the rim, to a temperature in the range of from 200° to 350° F. to foam and cure the synthetic rubber disposed in the cavity formed between the tire and wheel rim, the pressure exerted by the foamed rubber against the tire being in corresponding relation to the amount of unfoamed rubber placed within the tire.

25. The method of claim 24, wherein planes including the inner crown and layer closest thereto, are concentric and do not intersect.

26. The method of claim 24, wherein planes including the inner crown and layer closest thereto, intersect.

27. The method of claim 24, wherein each strip of unfoamed synthetic rubber is relatively thin compared to the depth (D) of the tire cavity, such that a number of layers are required to form the insert.

28. The method of claim 27, wherein any joints between successive layers of rubber are in arcuate staggered relation.

* * * * *